United States Patent
Lan

(10) Patent No.: US 8,441,899 B2
(45) Date of Patent: May 14, 2013

(54) METHOD AND APPARATUS FOR COMPENSATING PERIODIC SIGNAL

(75) Inventor: Kuo-jung Lan, Jhonghe (TW)

(73) Assignee: Mediatek, Inc., Hsin-Chu (TW)

(*) Notice: Subject to any disclaimer, the term of this patent is extended or adjusted under 35 U.S.C. 154(b) by 58 days.

(21) Appl. No.: 13/181,125

(22) Filed: Jul. 12, 2011

(65) Prior Publication Data
US 2011/0267131 A1 Nov. 3, 2011

Related U.S. Application Data

(62) Division of application No. 11/834,787, filed on Aug. 7, 2007, now abandoned.

(60) Provisional application No. 60/823,590, filed on Aug. 25, 2006.

(51) Int. Cl.
*G11B 20/10* (2006.01)
*G11B 7/095* (2006.01)
*G05B 11/28* (2006.01)

(52) U.S. Cl.
USPC .......... 369/44.11; 369/44.25; 369/44.29; 369/44.32; 369/44.35; 369/44.36

(58) Field of Classification Search .......... 369/44.32
See application file for complete search history.

(56) References Cited

U.S. PATENT DOCUMENTS

| | | | |
|---|---|---|---|
| 5,742,573 A | 4/1998 | Hajjar et al. | |
| 6,590,843 B1 | 7/2003 | Zhuang | |
| 6,847,503 B2 | 1/2005 | Zhang et al. | |
| 6,934,099 B2 * | 8/2005 | Oda et al. | 360/27 |
| 7,049,779 B2 * | 5/2006 | Chen et al. | 318/400.09 |
| 7,280,304 B2 | 10/2007 | Wu | |
| 2002/0122367 A1 * | 9/2002 | Hirai | 369/53.14 |
| 2003/0067696 A1 | 4/2003 | Maeda et al. | |
| 2007/0121439 A1 * | 5/2007 | Dekker | 369/44.28 |
| 2008/0049571 A1 * | 2/2008 | Lan | 369/44.32 |
| 2009/0296546 A1 * | 12/2009 | Doi | 369/47.28 |
| 2011/0063958 A1 * | 3/2011 | Kadlec | 369/44.11 |

* cited by examiner

*Primary Examiner* — Wayne Young
*Assistant Examiner* — Dionne Pendleton

(57) ABSTRACT

An apparatus and a method for compensating periodic signal in an optical disc drive are described. The control apparatus includes an amplitude processing unit, a phase processing unit, a wave generator, a first switch module and a second switch module. The amplitude processing unit processes the amplitude of the input signal based on a reference signal for generating an amplitude signal. The phase processing unit processes the phase of the input signal based on the reference signal for generating a phase signal. The first switch module switches the amplitude signal to select one of the amplitude value and a predetermined amplitude value. The second switch module switches the phase signal to select one of the phase value and a predetermined phase value. The wave generator generates a compensated wave signal based on the selected amplitude value and the selected phase value, and outputs the compensated wave signal.

34 Claims, 17 Drawing Sheets

METHOD AND APPARATUS FOR COMPENSATING PERIODIC SIGNAL

CROSS REFERENCE TO RELATED APPLICATION

This is a division of application Ser. No. 11/834,787, filed on Aug. 7, 2007, which is claimed priority from U.S. Provisional Patent Application Ser. No. 60/823,590, which are entitled "A METHOD AND APPARATUS OF COMPENSATING PERIODIC SIGNAL" and filed on Aug. 25, 2006 and is incorporated herein by reference in its entirety.

FIELD OF THE INVENTION

The present invention relates to a control apparatus and method, and more particularly to an apparatus and a method for compensating periodic signal by detecting an amplitude signal and a phase signal to generate a wave signal for compensating the periodic signal of the optical disk in an optical disc drive.

BACKGROUND OF THE INVENTION

FIG. 1 is a schematic diagram of a conventional apparatus 100 for compensating periodic signal in an optical disc drive. The conventional apparatus 100 includes a runout band pass compensator 102 and a servo compensator 104. There are many kinds of servo signals, such as tracking error signal, focusing error signal, and radio frequency signal, etc. Taking tracking error signal as an example, the servo compensator 104 receives the tracking error signal ($S_{te}$) and generates a tracking actuator output signal ($S_{tc}$). The runout band pass compensator 102 receives also the tracking error signal ($S_{te}$) and generates a runout compensated signal ($S_{com}$) for compensating the tracking actuator output signal ($S_{tc}$).

The runout band pass compensator 102 is utilized to compensate the periodic signal. Taking an example of an eccentric disk, the runout band pass compensator 102 compensates the periodic signal which results from the runout effect. However, because the band pass frequency of the runout band pass compensator 102 must be the same as the rotation frequency of the spindle motor (not shown) in the optical disc drive, it is required to design the runout band pass compensator carefully. Moreover, the conventional apparatus 100 cannot be employed for the periodic signal during a track jump of the optical disk.

In the optical disc drive, it is quite important for optical pick-up unit (OPU) to follow the track of the optical disk in order to decode the data on the disk correctly. However, due to the eccentric disk, the tracking signal will be disturbed by the periodic signal having a single frequency. Such a periodic signal due to the runout effect affects the data decoding performance disadvantageously. Consequently, there is a need to develop a control apparatus to solve the above-mentioned problems.

SUMMARY OF THE INVENTION

The present invention sets forth an apparatus and a method for compensating periodic signal.

The control apparatus includes an amplitude processing unit, a phase processing unit, a wave generator, a first switch module and a second switch module. The amplitude processing unit and the phase processing unit, respectively, couple the optical disc drive to the first switch module and the second switch module. The wave generator connects to the node. The amplitude processing unit processes the amplitude of the input signal ($S_{in}$) based on a reference signal ($S_{ref}$) for generating an amplitude signal ($S_{ad}$) wherein the amplitude signal ($S_{ad}$) has at least one amplitude value ($V_{ad}$). The phase processing unit processes the phase of the input signal ($S_{in}$) based on the reference signal ($S_{ref}$) for generating a phase signal ($S_{pd}$) wherein the phase signal ($S_{pd}$) has at least one phase value ($V_{pd}$) during the cycle of the reference signal ($S_{ref}$). The first switch module switches the amplitude signal to select one of the amplitude value and a predetermined amplitude value. The second switch module switches the phase signal to select one of the phase value and a predetermined phase value. The wave generator generates a compensated wave signal ($S_{com}$) based on the selected amplitude value and the selected phase value during the cycle of the reference signal ($S_{ref}$), and the wave generator outputs the compensated wave signal ($S_{com}$) for compensating the periodic signal of the input signal ($S_{in}$).

Further, the amplitude processing unit comprises a first detecting module and a first adapting module. The first detecting module couples the optical disc drive to the first adapting module and the first adapting module connects the first detecting module to the first switch module. The first detecting module receives the input signal input signal ($S_{in}$) and detects the amplitude of the input signal ($S_{in}$) for generating the amplitude value ($V_{ad}$). The first adapting module adapts the amplitude signal ($S_{ad}$) to determine the bandwidth of the control apparatus based on the amplitude value ($V_{ad}$).

In addition, the phase processing unit further comprises a second detecting module and a second adapting module. The second detecting module couples the optical disc drive to the second adapting module and the second adapting module connects the second detecting module to the second switch module. The second detecting module receives the input signal ($S_{in}$) and detects the phase of the input signal ($S_{in}$) for generating the phase value ($V_{pd}$). The second adapting module adapts the phase signal ($S_{pd}$) to determine the bandwidth of the control apparatus based on the phase value ($V_{pd}$).

The control apparatus performs the control method for compensating the periodic signal accompanied with an input signal. The method includes the following steps:

In step (a), the amplitude processing unit processes the amplitude of the input signal based on a reference signal for generating an amplitude signal wherein the amplitude signal has at least one amplitude value.

During the step (a), the control method further comprises the steps of:

In step (a1), the first detecting module detects the amplitude of the input signal for generating the amplitude value.

In step (a2), the first adapting module adapts the amplitude signal to determine the bandwidth based on the amplitude value.

The amplitude value of amplitude signal corresponds to one cycle of the reference signal. After generating the amplitude value during the cycle of the reference signal, the control apparatus sends the amplitude value during next cycle of the reference signal.

In step (b), the phase processing unit processes the phase of the input signal based on the reference signal for generating a phase signal wherein the phase signal has at least one phase value.

During the step (b), the control method further comprises the steps of:

In step (b1), the second detecting module detects the phase of the input signal for generating the phase value.

In step (b2), the second adapting module adapts the phase signal to determine the bandwidth based on the phase value.

In step (c), the first switch module switches the amplitude signal to select one of the amplitude value and a predetermined amplitude value for the wave generator.

In step (d), the second switch module switches the phase signal to select one of the phase value and a predetermined phase value for the wave generator.

In step (e), the wave generator generates a compensated wave signal based on the selected amplitude value and the selected phase value. In one embodiment, the compensated wave signal is a sine wave signal.

In step (f), the wave generator outputs the compensated wave signal.

In one embodiment, after the wave generator outputs the compensated wave signal in the step (f), the control method further comprises the steps:

In step (b3), the third switch switches the input signal and the compensated wave signal to select one of the compensated wave signal and the combination of the input signal and the compensated wave signal based on an effect signal. In step (b4), if the defect signal enables the third switch, the third switch outputs the compensated wave signal based on the predetermined amplitude value and the predetermined phase value. In step (b5), if the defect signal disables the third switch, the control method outputs the combination of the input signal and the compensated wave signal based on the amplitude value and the phase value.

The advantages of the present invention mainly include: (a) solving the runout problems of an eccentric disk, a track jump due to an eccentric disk, and a defect area due to an eccentric disk in the optical disc drive; and (b) solving the wobble effect of a vertical deviation disk in the optical disc drive.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The present invention is directed to an apparatus and a method for compensating periodic signal to solve the runout problem of an eccentric disk in an optical disc drive. Furthermore, the apparatus and method for compensating periodic signal is capable of solving the wobble effect of a vertical deviation disk in the optical disc drive.

Figure 1:
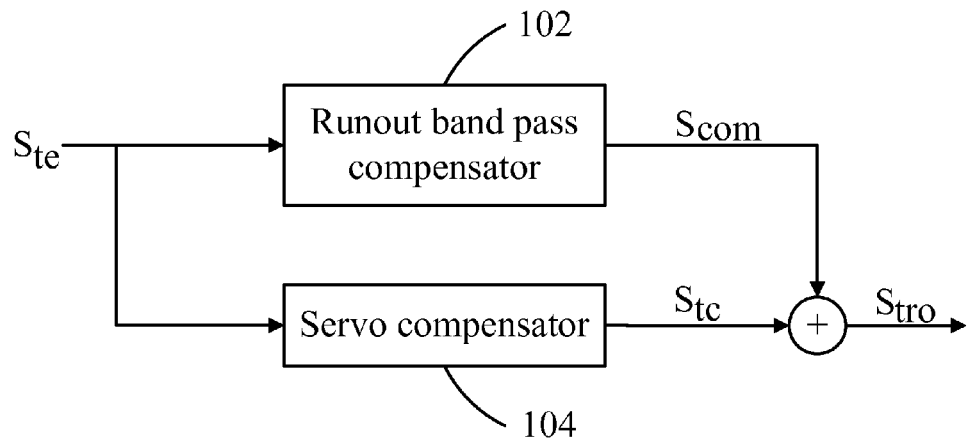
FIG. 1 is a schematic diagram of a conventional apparatus for compensating periodic signal in an optical disc drive.
Figure 2:
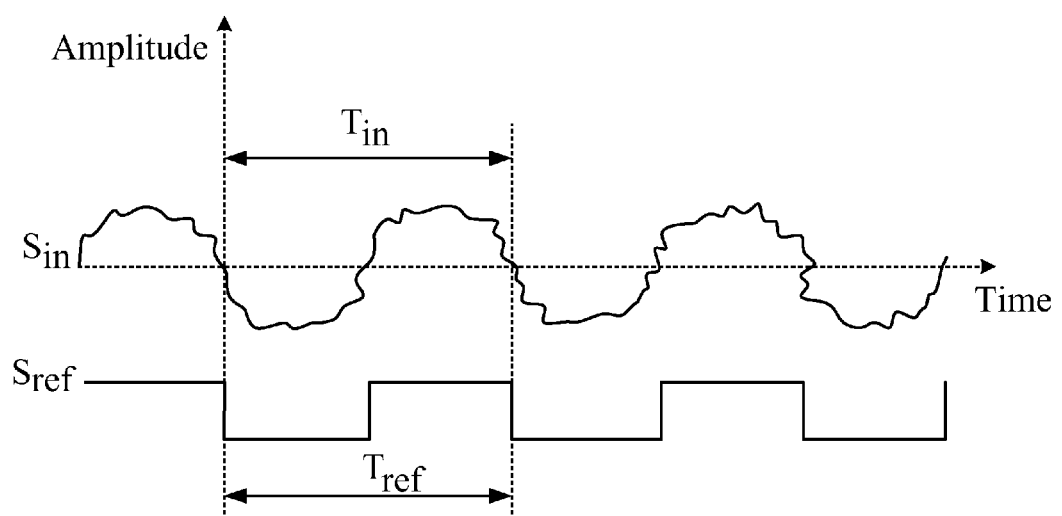
FIG. 2 is schematic waveform of an input signal ($S_{in}$) based on a reference signal ($S_{ref}$) according to one embodiment of the present invention.

FIG. 2 is schematic waveform of an input signal ($S_{in}$) based on a reference signal ($S_{ref}$) according to one embodiment of the present invention. The horizontal axis and vertical axis represents time and amplitude (or termed as "magnitude"), respectively. The input signal ($S_{in}$), including the runout component due to the eccentric disk, corresponds to the reference signal ($S_{ref}$). That is, the input signal ($S_{in}$) accompanies with the periodic signal associated with the runout, and the runout period ($T_{in}$) of the input signal ($S_{in}$) is approximately equal to the period ($T_{ref}$) of the reference signal ($S_{ref}$). In one embodiment, the input signal ($S_{in}$) may be tracking error signal, focusing error signal, radio frequency signal or the like. The reference signal ($S_{ref}$) may be the rotation signal associated with the optical disk, such as the frequency generator (FG) signal generated from the spindle motor in the optical disc drive. For example, the period of the tracking error signal approximates to the period of the frequency generator (FG) of the spindle motor, wherein the period of the frequency generator (FG) represents one revolution of the spindle motor.

Figure 3:
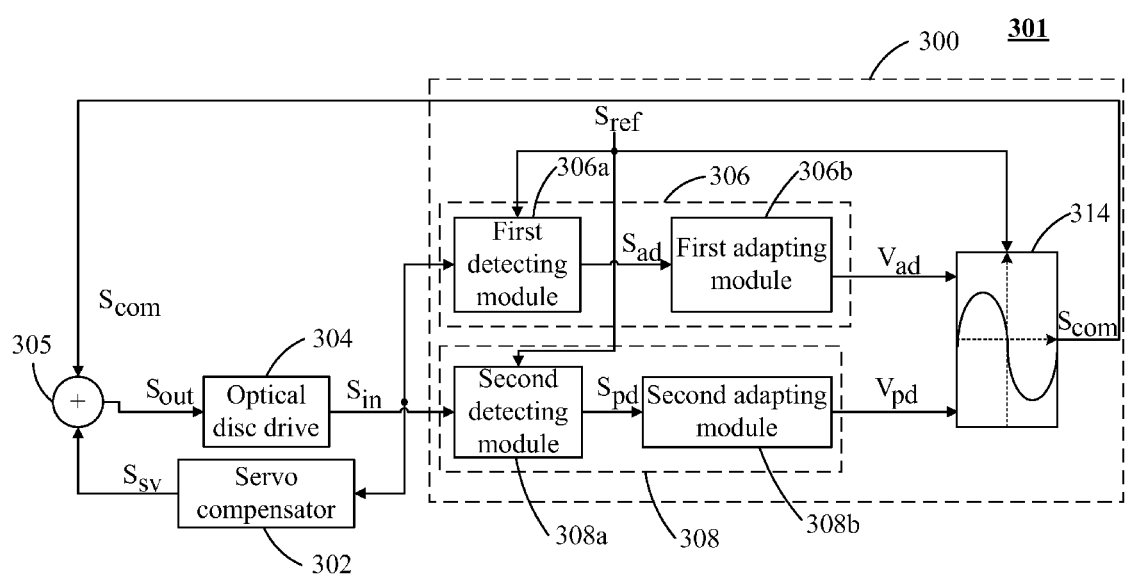
FIG. 3 is a schematic block diagram of a control apparatus for compensating periodic signal in a closed-loop servo system according to a first embodiment of the present invention.

Because the periodic signal in the input signal ($S_{in}$) has a single frequency, i.e. a fixed periodic disturbance, the control apparatus, as shown in FIG. 3, utilizes a wave signal having the same as the single frequency based on the reference signal ($S_{ref}$) for compensating the periodic signal in order to cancel the runout. The control apparatus establishes a wave signal, e.g. sine wave signal, by an amplitude value and a phase value associated with the period ($T_{ref}$) of the reference signal ($S_{ref}$). For example, the period of the wave signal is the same as the rotation period in one revolution of the spindle motor.

FIG. 3 is a schematic block diagram of a control apparatus for compensating periodic signal in a closed-loop servo system 301 according to a first embodiment of the present invention. The closed-loop servo system 301 includes a control apparatus 300, a servo compensator 302, e.g. tracking compensator or focusing compensator, and an optical disc drive 304. The control apparatus 300 and the servo compensator 302, respectively, couple to the optical disc drive 304. The servo compensator 302 receives the input signal ($S_{in}$) to generate a servo signal ($S_{sv}$). The control apparatus 300 receives the input signal ($S_{in}$) and generates a compensated wave signal ($S_{com}$) for compensating the servo signal ($S_{sv}$) of the servo compensator 302 via a node 305 in order to output the output signal ($S_{out}$). The control apparatus 300 will be described in detail as follows.

The control apparatus 300 includes an amplitude processing unit 306, a phase processing unit 308, and a wave generator 314. The amplitude processing unit 306 and the phase processing unit 308, respectively, couple the optical disc drive 304 to the wave generator 314. The wave generator 314 connects to the node 305. The amplitude processing unit 306 processes the amplitude of the input signal ($S_{in}$) based on a reference signal ($S_{ref}$) for generating an amplitude signal ($S_{ad}$) wherein the amplitude signal ($S_{ad}$) has at least one amplitude value ($V_{ad}$). The phase processing unit 308 processes the phase of the input signal ($S_{in}$) based on the reference signal ($S_{ref}$) for generating a phase signal ($S_{pd}$) wherein the phase signal ($S_{pd}$) has at least one phase value ($V_{pd}$) during the cycle of the reference signal ($S_{ref}$). The wave generator 314 generates a compensated wave signal ($S_{com}$) based on the amplitude value ($V_{ad}$) and the phase value ($V_{pd}$) during the cycle of the reference signal ($S_{ref}$), and the wave generator 314 outputs the compensated wave signal ($S_{com}$) for compensating the periodic signal of the input signal ($S_{in}$).

Further, the amplitude processing unit 306 comprises a first detecting module 306a and a first adapting module 306b. The first detecting module 306a couples the optical disc drive 304 to the first adapting module 306b and the first adapting module 306b connects the first detecting module 306a to the wave generator 314. The first detecting module 306a receives the input signal input signal ($S_{in}$) and detects the amplitude of the input signal ($S_{in}$) for generating the amplitude value ($V_{ad}$). The first adapting module 306b adapts the amplitude signal ($S_{ad}$) to determine the bandwidth of the control apparatus 300 based on the amplitude value ($V_{ad}$).

In addition, the phase processing unit 308 further comprises a second detecting module 308a and a second adapting module 308b. The second detecting module 308a couples the optical disc drive 304 to the second adapting module 308b and the second adapting module 308b connects the second detecting module 308a to the wave generator 314. The second detecting module 308a receives the input signal ($S_{in}$) and detects the phase of the input signal ($S_{in}$) for generating the phase value ($V_{pd}$). The second adapting module 308b adapts the phase signal ($S_{pd}$) to determine the bandwidth of the control apparatus 300 based on the phase value ($V_{pd}$).

For example, the first adapting unit 306b may be a gain adjusting device or a low-pass filter. If the first adapting unit 306b is gain adjusting device, the gain adjusting device adjusts the gain of the amplitude signal ($S_{ad}$) to modify the amplitude value ($V_{ad}$). If the first adapting unit 306b is a low-pass filter, the low-pass filter filters the amplitude signal ($S_{ad}$) to cancel the noise in the amplitude signal ($S_{ad}$). Similarly, the second adapting unit 308b is gain adjusting device, the gain adjusting device adjusts the gain of the phase signal ($S_{pd}$) to modify the phase value ($V_{pd}$). If the second adapting unit 308b is a low-pass filter, the low-pass filter filters the phase signal ($S_{pd}$) to cancel the noise in the phase signal ($S_{pd}$).

Person skilled in the art should note that both the first adapting unit 306b and the second adapting unit 308b may be the same or different.

Figure 4:
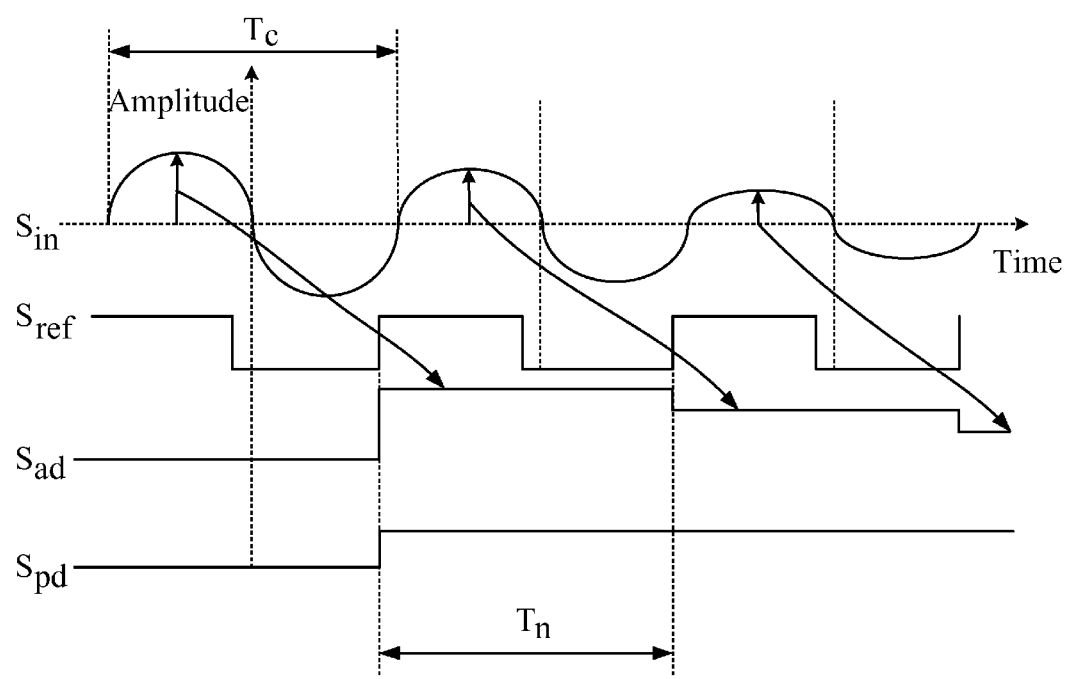
FIG. 4 is schematic waveform of an amplitude signal ($S_{ad}$) of the amplitude detector and a phase signal ($S_{pd}$) of the phase detector shown in FIG. 3 based on the input signal ($S_{in}$) and the reference signal ($S_{ref}$) according to one embodiment of the present invention.

Please refer to FIG. 3 and FIG. 4 which depicts schematic waveform of an amplitude signal ($S_{ad}$) of the first detecting module 306a and a phase signal ($S_{pd}$) of the second detecting module 308a shown in FIG. 3 based on the input signal ($S_{in}$) and the reference signal ($S_{ref}$) according to one embodiment of the present invention. The horizontal axis and vertical axis represents time and amplitude (or termed as "magnitude"), respectively. The frequency of the input signal ($S_{in}$) is the same as the frequency of the reference signal ($S_{ref}$).

Based on the reference signal ($S_{ref}$), the first detecting module 306a detects the amplitudes of the input signal ($S_{in}$), generates the amplitude value ($V_{ad}$) of amplitude signal ($S_{ad}$) corresponding to the period of the reference signal ($S_{ref}$), and sends the amplitude value ($V_{ad}$) to the first adapting unit 306b. That is, the first detecting module 306a measures the amplitude of the input signal ($S_{in}$) per period of the reference signal ($S_{ref}$). Preferably, after generating the amplitude value ($V_{ad}$) of the input signal ($S_{in}$) during the current cycle ($T_c$) corresponding to the reference signal ($S_{ref}$), the first detecting module 306a sends the amplitude value ($V_{ad}$) of the amplitude signal ($S_{ad}$) to the wave generator 314 during next cycle ($T_n$) corresponding to the reference signal ($S_{ref}$) for the first adapting unit 306b.

Similarly, based on the reference signal ($S_{ref}$), the second detecting module 308a detects the phases of the input signal ($S_{in}$), generates the phase value ($V_{pd}$) of amplitude signal ($S_{pd}$) corresponding to the period of the reference signal ($S_{ref}$), and sends the phase signal ($S_{pd}$) to the second adapting unit 308b. That is, the second detecting module 308a measures the phase per period of the input signal ($S_{in}$). Preferably, after generates the phase value ($V_{pd}$) of the input signal ($S_{in}$) during the current cycle ($T_c$) corresponding to the reference signal ($S_{ref}$), the second detecting module 308a sends the phase value ($V_{pd}$) of the phase signal ($S_{pd}$) to the wave generator 314 during next cycle ($T_n$) corresponding to the reference signal ($S_{ref}$) for the second adapting unit 308b.

Figure 5:
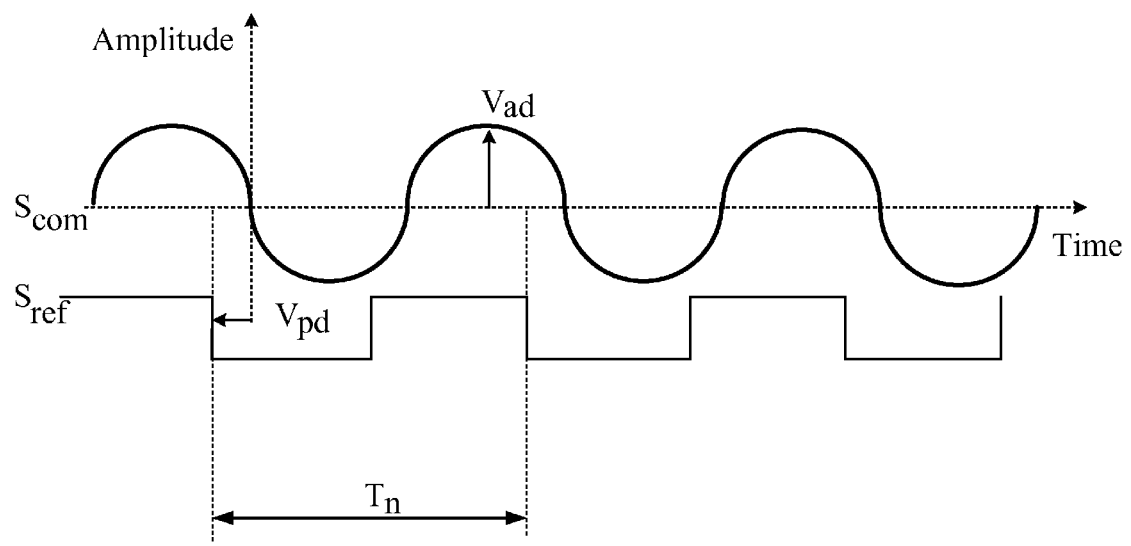
FIG. 5 is schematic waveform of the compensated wave signal ($S_{com}$) of the wave generator shown in FIG. 3 based on the reference signal ($S_{ref}$) according to one embodiment of the present invention.

Please refer to FIG. 3 and FIG. 5 which depicts schematic waveform of the compensated wave signal ($S_{com}$) of the wave generator 314 shown in FIG. 3 based on the reference signal ($S_{ref}$) according to one embodiment of the present invention. The horizontal axis and vertical axis represents time and amplitude (or termed as "magnitude"), respectively. The frequency of the compensated wave signal ($S_{com}$) is the same as the frequency of the reference signal ($S_{ref}$). The wave generator 314 controls the amplitude value ($V_{ad}$) from the first adapting unit 306b and the phase value ($V_{pd}$) from the second adapting unit 308b for generating the compensated wave signal ($S_{com}$) during the cycle $T_n$. Then, the control apparatus 300 sends the compensated wave signal ($S_{com}$) to the node 305, and the compensated wave signal ($S_{com}$) is added to the servo signal ($S_{sv}$) of the servo compensator 302 at the node 305 in order to generate an output signal ($S_{out}$) for the optical disc drive 304.

Since the servo signal ($S_{sv}$) is generated from the input signal ($S_{in}$) having a periodic signal therein, when the wave generator 314 utilizes the compensated wave signal ($S_{com}$) to compensate the servo signal ($S_{sv}$), the periodic signal of the input signal ($S_{in}$) due to the runout is cancelled and the output signal ($S_{out}$) is free from the periodic signal. Therefore, the control apparatus 300 solves the problem of the runout effect.

Figure 6:
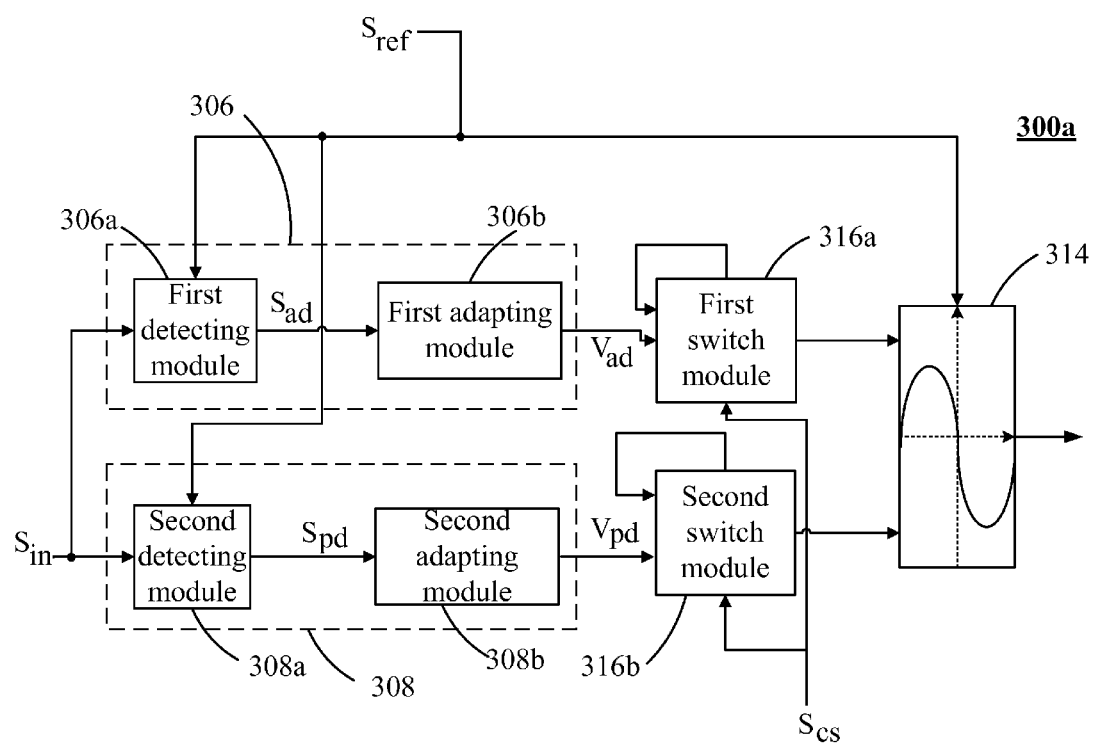
FIG. 6 is a schematic block diagram of a control apparatus having predetermined amplitude values and predetermined phase values for compensating the periodic signal in a closed-loop servo system according to a second embodiment of the present invention.

FIG. 6 is a schematic block diagram of a control apparatus 300a having predetermined amplitude values and predetermined phase values for compensating the periodic signal in a closed-loop servo system according to a second embodiment of the present invention. The control apparatus 300a in FIG. 6 is similar to that in FIG. 3 except a first switch module 316b and a second switch module 316a among the first adapting unit 306b, the second adapting unit 308b, and the wave generator 314. The first switch module 316a, e.g. multiplexer, couples the first adapting unit 306b to the wave generator 314, and the second switch module 316b, e.g. multiplexer, couples the second adapting unit 308b to the wave generator 314. The first switch module 316a holds the amplitude value ($V_{ad}$) from the first adapting unit 306b and the second switch module 316b holds the phase value ($V_{pd}$) from the second adapting unit 308b, and meanwhile, the amplitude value ($V_{ad}$) represents the predetermined amplitude value and the phase value ($V_{pd}$) represents the predetermined phase value. Further, the first switch module 316a switches the amplitude signal ($S_{ad}$) to select one of the amplitude value ($V_{ad}$) and the predetermined amplitude value, and the second switch module 316b switches the phase signal ($S_{pd}$) to select one of the phase value ($V_{pd}$) and the predetermined phase value. The wave generator 314 then outputs a wave signal if a condition signal ($S_{sc}$) activates the first switch module 316 and the second switch 316b.

For an example of multiplexer for the first switch module 316a and the second switch module 316b, when the condition signal ($S_{sc}$) disables the first multiplexer 316a and the second multiplexer 316b, the first multiplexer 316a transmits the amplitude value ($V_{ad}$) from the first adapting unit 306b to the wave generator 314 and the second multiplexer 316b transmits the phase value ($V_{pd}$) from the second adapting unit 308b to the wave generator 314. When the condition signal ($S_{sc}$) enables the first multiplexer 316a and the second multiplexer 316b, the first multiplexer 316a transmits the predetermined amplitude value from the first adapting unit 306b to the wave generator 314 and the second multiplexer 316b transmits the predetermined phase value from the second adapting unit 308b to the wave generator 314. Thus, the wave generator 314 outputs a fixed sine wave signal according to the predetermined amplitude value and the predetermined phase value.

Figure 7A:
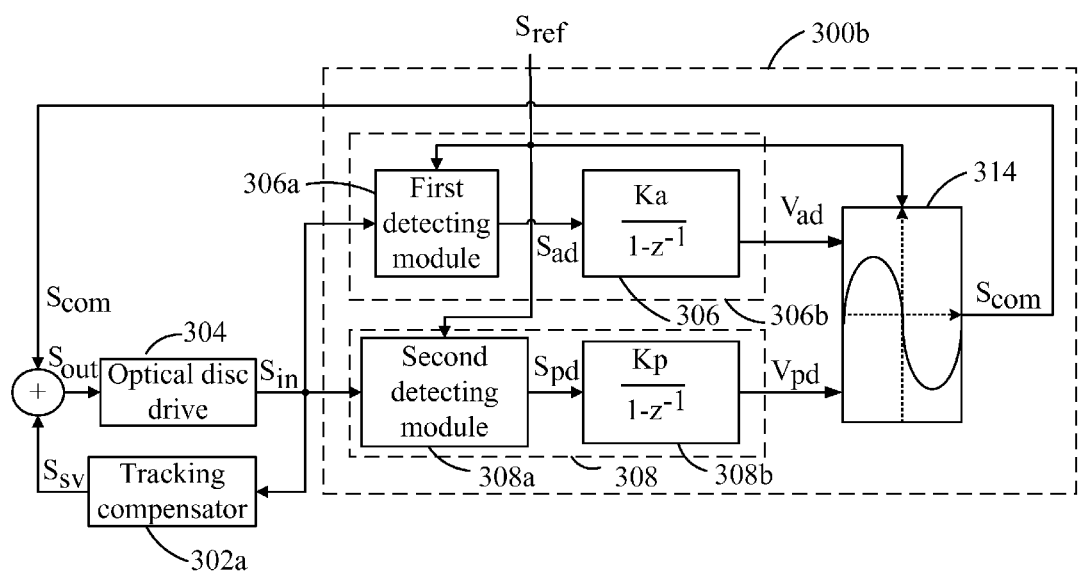
FIG. 7A is a schematic block diagram of a control apparatus shown in FIG. 3 for compensating the periodic signal due to an eccentric disk according to one embodiment of the present invention.
Figure 7B:
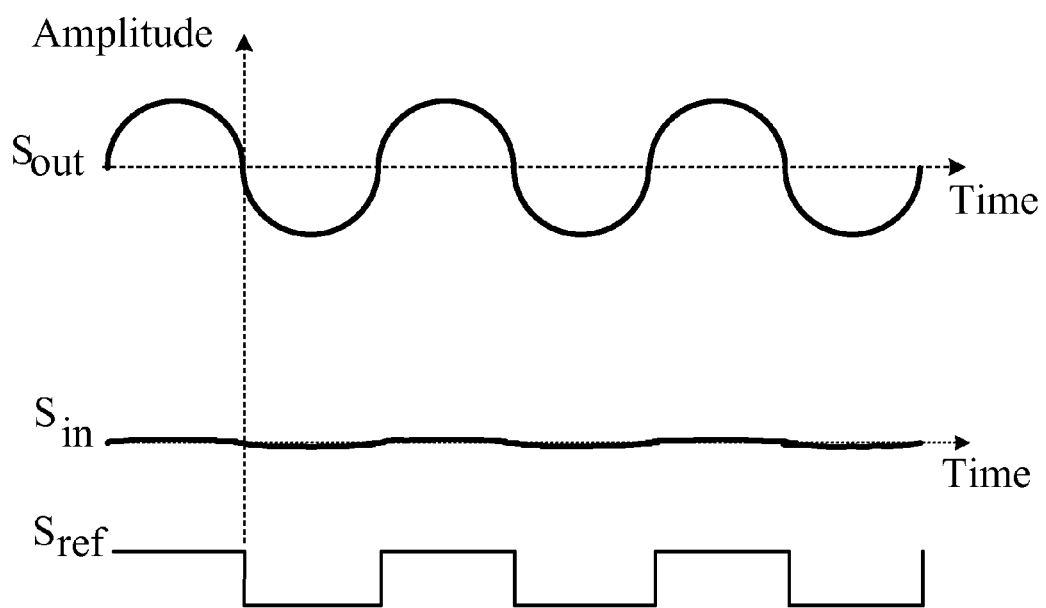
FIG. 7B is schematic waveform of the output signal ($S_{out}$), the input signal ($S_{in}$), and the reference ($S_{ref}$) shown in FIG. 7A according to one embodiment of the present invention.

Please refer to FIG. 7A and FIG. 7B. FIG. 7A is a schematic block diagram of a control apparatus 300b shown in FIG. 3 for compensating the periodic signal due to an eccentric disk according to one embodiment of the present invention. FIG. 7B is schematic waveform of the tracking actuator output signal ($S_{out}$), the tracking error signal ($S_{in}$), and the frequency generator (FG) signal ($S_{ref}$) shown in FIG. 7A according to one embodiment of the present invention.

As shown in FIG. 7A, the first detecting module 306a detects the amplitude of the tracking error signal ($S_{in}$) based on the FG signal ($S_{ref}$) for generating an amplitude signal ($S_{ad}$) wherein the amplitude signal ($S_{ad}$) has at least one amplitude value ($V_{ad}$) during the cycle of the FG signal. The second detecting module 308a detects the phase of the tracking error signal ($S_{in}$) based on the FG signal ($S_{ref}$) for generating a phase signal ($S_{pd}$) wherein the phase signal ($S_{pd}$) has at least one phase value ($V_{pd}$) during the cycle of the FG signal ($S_{ref}$). In one embodiment, the first detecting module 306a is a peak hold circuit for holding the peak of the tracking error signal ($S_{in}$) to generate the amplitude value ($V_{ad}$). The second detecting module 308a employs a comparator (not shown) to cross the tracking error signal ($S_{in}$) with the zero amplitude value of the horizontal axis based on the FG signal ($S_{ref}$) for generating the phase value ($V_{pd}$). That is, the second detecting module 308a uses the comparator to detect the zero cross point at the horizontal axis.

As shown in FIG. 3 and FIG. 7A, the first adapting unit 306b may be the combination, e.g. product, of an amplitude gain ($K_a$) and a first integrator, e.g. an digital integrator represented by the formula of ($1/(1-z^{-1})$), where the amplitude gain $K_a$ is integer coefficient and "z" is a variable in z-transformation domain. Similarly, the second adapting unit 308b may be the product of a phase gain ($K_p$) and a second integrator, e.g. the formula of ($1/(1-z^{-1})$), where the phase gain $K_p$ is integer coefficient and "z" is a variable in z-transformation domain. In this case, the structure of first adapting unit 306b is the same as or different from the second adapting unit 308b. The product of the amplitude gain ($K_a$) and the first integrator adapts the amplitude signal ($S_{ad}$) to determine the bandwidth of the control apparatus 300a based on the amplitude value ($V_{ad}$). The product of the phase gain ($K_p$) and the second integrator adapts the phase signal ($V_{pd}$) to determine the bandwidth of the control apparatus 300a based on the phase value ($V_{pd}$). Person skilled in the art should note that both the product of the amplitude gain ($K_a$) and the first integrator and the product of the phase gain ($K_p$) and the second integrator may be the same or different.

As shown in FIG. 7A and FIG. 7B, the wave generator 314 generates a compensated wave signal ($S_{com}$) based on the amplitude value ($V_{ad}$) and the phase value ($V_{pd}$) during the cycle of the FG signal ($S_{ref}$), and the wave generator 314 outputs the compensated wave signal ($S_{com}$) to the optical disc drive 304 for compensating the periodic signal of the tracking error signal ($S_{in}$). When the compensated wave signal ($S_{com}$) compensates the servo signal ($S_{sv}$) to generate the compensated tracking actuator output signal ($S_{out}$), the periodic signal combined with the tracking error signal ($S_{in}$) is eliminated. In other words, after the closed-loop servo system 301a is stable, the periodic signal due to the runout is cancelled out of the tracking error signal ($S_{in}$) during the cycle of the FG signal ($S_{ref}$). The tracking actuator output signal ($S_{out}$) then follows the track of the eccentric disk based on the FG signal ($S_{ref}$). Therefore, the control apparatus 300 solves the problem of the runout effect due to the eccentric disk.

Figure 8A:
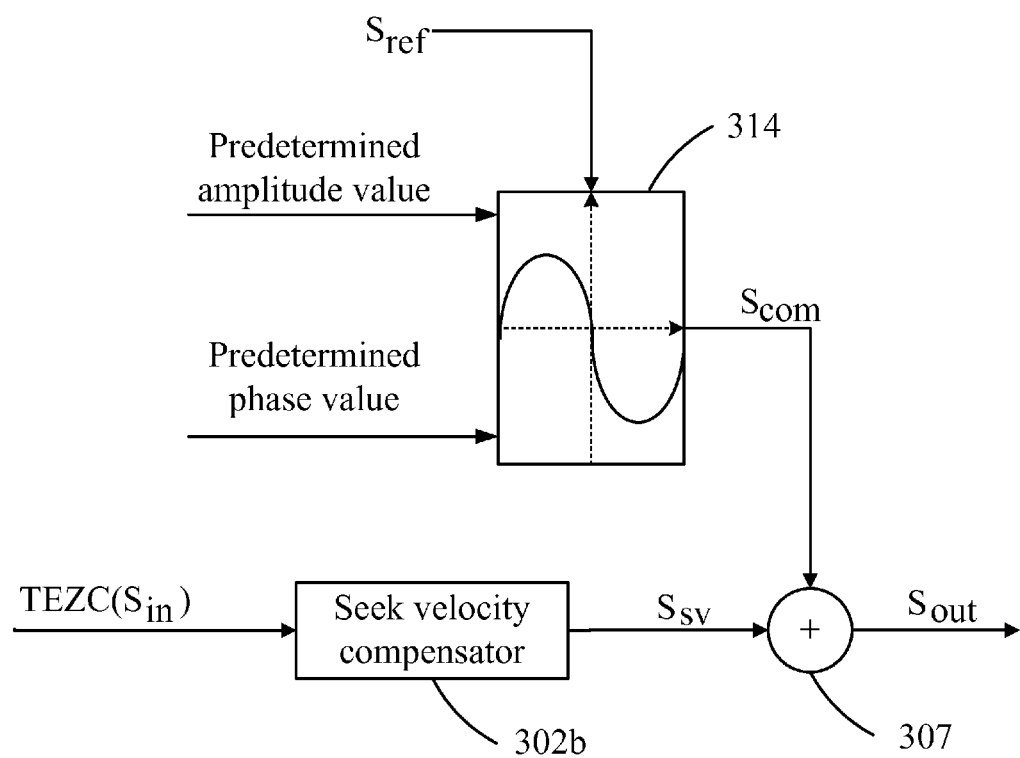
FIG. 8A is a schematic block diagram of a wave generator shown in FIG. 6 for compensating the periodic signal during a track jump due to an eccentric disk according to a first embodiment of the present invention.
Figure 8B:
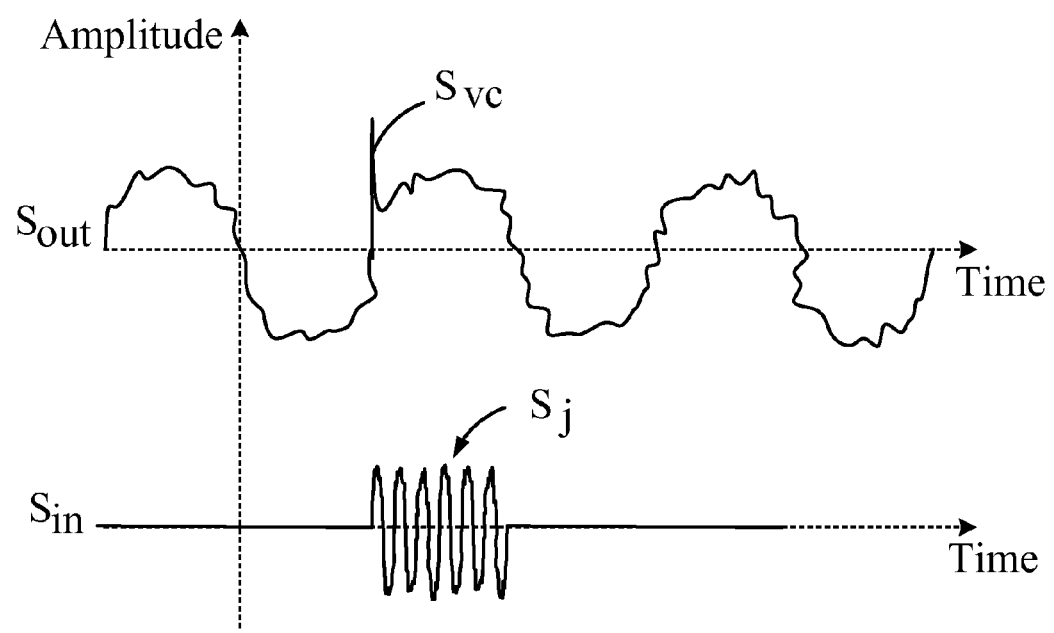
FIG. 8B is schematic waveform of the tracking actuator output signal ($S_{tro}$) and the tracking error signal ($S_{in}$) shown in FIG. 8A according to one embodiment of the present invention.

Please refer to FIGS. 8A and 8B. FIG. 8A is a schematic block diagram of a wave generator shown in FIG. 6 for compensating the periodic signal during a track jump due to an eccentric disk according to a first embodiment of the present invention. FIG. 8B is schematic waveform of the tracking actuator output signal ($S_{out}$) and the tracking error signal ($S_{in}$) shown in FIG. 8A according to one embodiment of the present invention.

As shown in FIG. 8A, the wave generator 314 generates a compensated wave signal ($S_{com}$) based on the predetermined amplitude value and the predetermined phase value during the cycle of the FG signal ($S_{ref}$), and the wave generator 314 outputs the compensated wave signal ($S_{com}$) to the optical disc drive 304 for compensating the periodic signal of the servo signal ($S_{sv}$). The predetermined amplitude value is the last learned amplitude value and the predetermined phase value is the last learned phase value. Thus, the wave generator 314 outputs a fixed sine wave signal according to the predetermined amplitude value and the predetermined phase value.

A seek velocity compensator 302b receives the tracking error zero cross (TEZC) signal ($S_{in}$) and outputs the servo signal ($S_{sv}$), wherein the tracking error zero cross (TEZC) signal is generated from the tracking error signal ($S_{in}$). The tracking error zero cross (TEZC) signal ($S_{in}$), i.e. track crossing signal, is the signal of the zero cross point at the horizontal axis and represents the track velocity of the eccentric disk. The tracking error zero cross (TEZC) signal ($S_{in}$) passes through the seek velocity compensator 302b to control the track velocity in a specific profile.

As shown in FIG. 8B, when the optical disc drive 304 performs a track jump process due to an eccentric disk, a jump signal ($S_j$) disturbs the tracking error signal ($S_{in}$) and thus affects the tracking error zero cross (TEZC) signal ($S_{in}$) and the servo signal ($S_{sv}$). While the wave generator 314 outputs the wave signal ($S_{com}$) to the node 307 according to the predetermined amplitude value and the predetermined phase value, the seek velocity compensator 302b performs velocity control based on the fixed sine wave signal. The compensated tracking actuator output signal ($S_{out}$) is then outputted and the jump signal ($S_j$) is eliminated from the tracking actuator output signal ($S_{out}$). Further, during the cycle of the jumps signal ($S_j$), tracking actuator output signal ($S_{out}$) has velocity control signal ($S_{vc}$) to control the track crossing velocity.

Thus the control apparatus 300a is capable of improving the runout disturbance of the velocity control and enhances the performance when the optical disc drive 304 processes the track jump process. Therefore, the control apparatus 300a solves the problem of the runout effect during a track jump due to an eccentric disk.

Figure 9A:
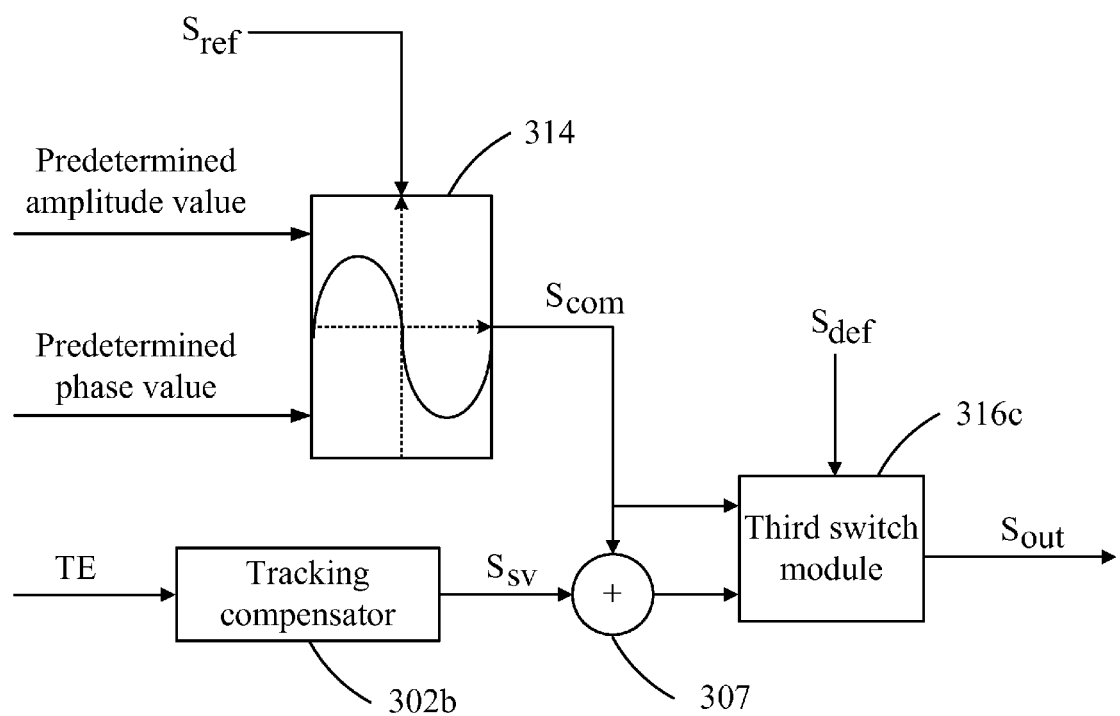
FIG. 9A is a schematic block diagram of a wave generator shown in FIG. 6 for compensating the periodic signal at a defect area due to an eccentric disk according to a second embodiment of the present invention.
Figure 9B:
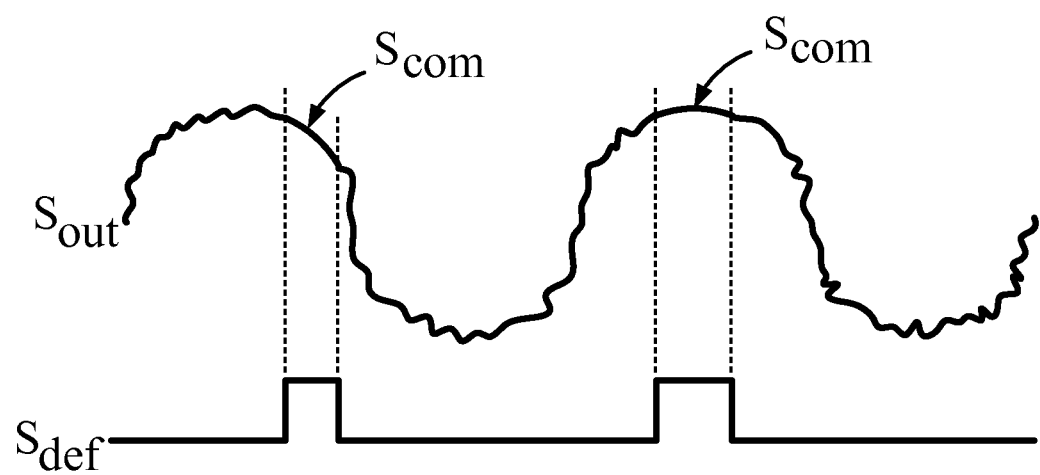
FIG. 9B is schematic waveform of the tracking actuator output signal ($S_{tro}$) and a defect signal ($S_{def}$) shown in FIG. 9A according to one embodiment of the present invention.

Please refer to FIG. 9A and FIG. 9B. FIG. 9A is a schematic block diagram of a wave generator 314 shown in FIG. 6 for compensating the periodic signal at a defect area due to an eccentric disk according to a second embodiment of the present invention. FIG. 9B is schematic waveform of the tracking actuator output signal ($S_{tro}$) and a defect signal ($S_{def}$) shown in FIG. 9A according to one embodiment of the present invention. The control apparatus 300a further comprises a third switch module 316c, e.g. multiplexer.

As shown in FIG. 9A, the wave generator 314 generates a compensated wave signal ($S_{com}$) based on the predetermined amplitude value and the predetermined phase value during the cycle of the FG signal ($S_{ref}$), and the wave generator 314 outputs the compensated wave signal ($S_{com}$) to the optical disc drive 304 for compensating the periodic signal of the servo signal ($S_{sv}$). The predetermined amplitude value ($V_{ad}$) is the last learned amplitude value and the predetermined phase value is the last learned phase value. Thus, the wave generator 314 outputs a fixed sine wave signal according to the predetermined amplitude value and the predetermined phase value. A tracking compensator 302b receives the tracking error signal ($S_{in}$) and outputs the servo signal ($S_{sv}$). The third switch module 316c is coupled to the wave generator 314, and the third switch module 316c couples to the tracking compensator 302 via the node 307.

As shown in FIG. 9B, in one embodiment, the optical disc drive 304 processes a defect area in an eccentric disk and issues a defect signal ($S_{def}$) to be a condition signal for activating the third switch module 316c, such as multiplexer. When the defect signal ($S_{def}$) disables the multiplexer 316c, the wave generator 314 outputs the wave signal ($S_{com}$) based on the amplitude value and the phase value to the node 307, the compensated signal ($S_{com}$) compensates the servo signal ($S_{sv}$) to generate the tracking actuator output signal ($S_{out}$), and the multiplexer 316c outputs both the compensated signal ($S_{com}$) and the servo signal ($S_{sv}$), i.e. the tracking actuator output signal ($S_{out}$), to the optical disc drive 304. When the defect signal ($S_{def}$) enables the multiplexer 316c, the wave generator 314 outputs the wave signal ($S_{com}$) according to the predetermined amplitude value and the predetermined phase value to the node 307, and the multiplexer 316c directly outputs the compensated wave signal ($S_{com}$) to the optical disc drive 304. That is, the wave generator 314 holds the last learned amplitude value and the last learned phase value.

Thus the control apparatus 300a is capable of improving the runout disturbance a defect area in an eccentric disk and enhances the encoding ability of the optical disk.

Figure 10:
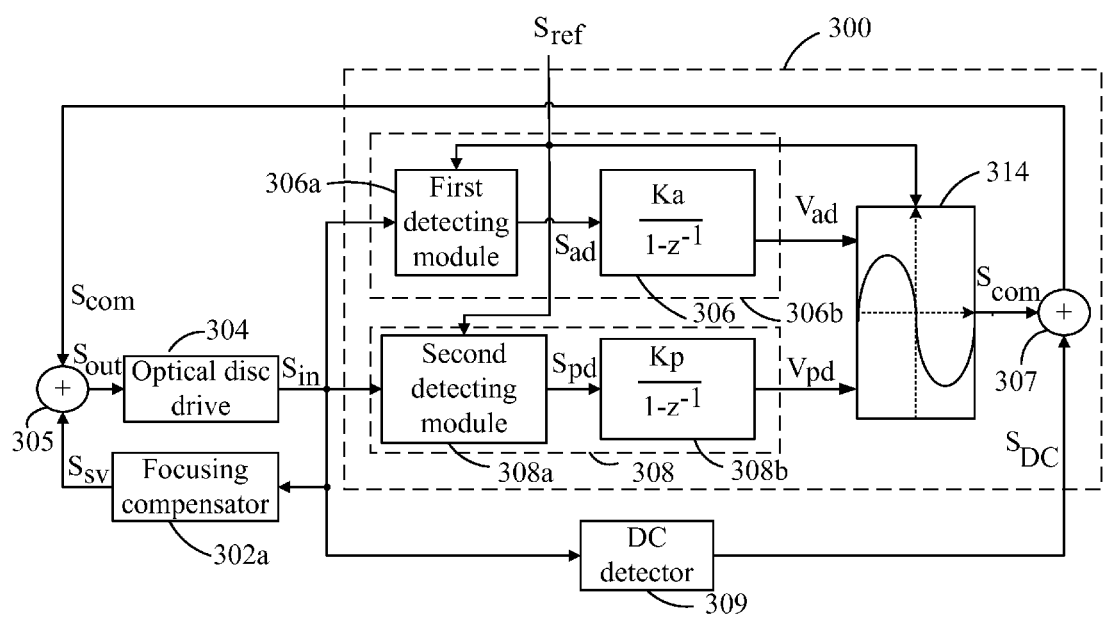
FIG. 10 is a schematic block diagram of a control apparatus shown in FIG. 3 for compensating the periodic signal due to a vertical deviation disk according to one embodiment of the present invention.

Please refer to FIG. 3 and FIG. 10 which is a schematic block diagram of a control apparatus shown in FIG. 3 for compensating the periodic signal due to a vertical deviation disk in the closed-loop servo system 301 according to one embodiment of the present invention. The vertical deviation in an optical disk causes a wobble signal and the wobble signal is regarded as a periodic signal on focusing error signal.

The control apparatus 300 and the focusing compensator 302c, respectively, couple to the optical disc drive 304. The focusing compensator 302c receives the focusing error signal ($S_{in}$) to generate a servo signal ($S_{sv}$). The control apparatus 300 receives the focusing error signal ($S_{in}$) and generates a compensated wave signal ($S_{com}$). In addition, the closed-loop servo system 301 further includes a DC detector 309 coupled to the optical disc drive 304. The DC detector 309 detects the DC level ($S_{DC}$) of the focusing error signal ($S_{in}$) and issues the DC level to the node 307 for compensating the compensated wave signal ($S_{com}$). The compensated wave signal ($S_{com}$) and the DC level ($S_{DC}$) are outputted from the node 307 to the node 305 for compensating the servo signal ($S_{sv}$) of the focusing compensator 302c in order to output the focus output signal ($S_{out}$). The control apparatus 300 will be described in detail as follows.

The first detecting module 306a detects the amplitude of the focusing error signal ($S_{in}$) based on the FG signal ($S_{ref}$) for generating an amplitude signal ($S_{ad}$) wherein the amplitude signal ($S_{ad}$) has at least one amplitude value ($V_{ad}$) during the cycle of the FG signal. The second detecting module 308a detects the phase of the focusing error signal ($S_{in}$) based on the FG signal ($S_{ref}$) for generating a phase signal ($S_{pd}$) wherein the phase signal ($S_{pd}$) has at least one phase value ($V_{pd}$) during the cycle of the FG signal ($S_{ref}$).

The first adapting unit 306b may be the product of an amplitude gain ($K_a$) and a first integrator, e.g. ($1/(1-z^{-1})$), where the amplitude gain $K_a$ is integer coefficient and z is a variable in z-transformation domain. Similarly, the second adapting unit 308b may be the combination, i.e. product, of a phase gain ($K_p$) and a second integrator, e.g. ($1/(1-z^{-1})$), where the phase gain $K_p$ is integer coefficient and "z" is a variable in z-transformation domain. In this case, the first integrator is equal to the second integrator. The product of the amplitude gain ($K_a$) and the first integrator adapts the amplitude signal ($S_{ad}$) to determine the bandwidth of the control apparatus 300 based on the amplitude value ($V_{ad}$). The product of the phase gain ($K_p$) and the second integrator adapts the phase signal ($V_{pd}$) to determine the bandwidth of the control apparatus 300 based on the phase value ($V_{pd}$). Preferably, the amplitude gain $K_a$ and the phase gain $K_p$ allows the closed-loop servo system 301 to be stable while the control apparatus 300 compensates the periodic signal of the focusing error signal ($S_{in}$) from the optical disc drive 304.

The wave generator 314 generates a compensated wave signal ($S_{com}$) based on the amplitude value ($V_{ad}$) and the phase value ($V_{pd}$) during the cycle of the FG signal ($S_{ref}$), and the wave generator 314 outputs the compensated wave signal ($S_{com}$) to the optical disc drive 304 for compensating the periodic signal of the focusing error signal ($S_{in}$). When the compensated wave signal ($S_{com}$) compensates the servo signal ($S_{sv}$) to generate the compensated tracking actuator output signal ($S_{out}$), the periodic signal which is combined with the focusing error signal ($S_{in}$) is eliminated. In other words, after the closed-loop servo system 301 is stable, the periodic signal due to the wobble is cancelled out of the focusing error signal ($S_{in}$) during the cycle of the FG signal ($S_{ref}$). The focus output signal ($S_{out}$) then follows the track of the vertical deviation based on the FG signal ($S_{ref}$). Therefore, the control apparatus 300 solves the problem of the wobble effect due to the vertical deviation disk.

Figure 11A:
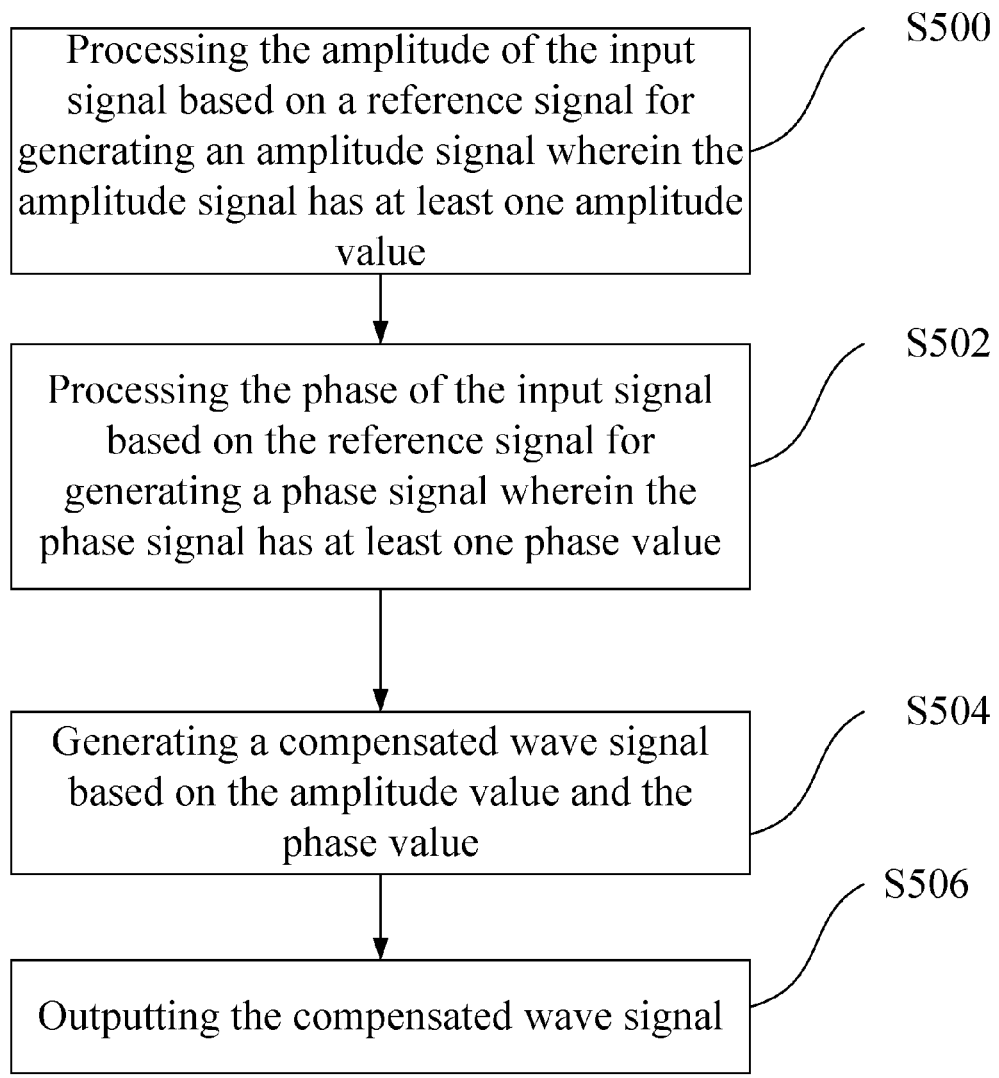
FIGS. 11A and 11D are flow charts of compensating the periodic signal in the optical disc drive according to one embodiment of the present invention.

Please refer to FIG. 3, FIG. 6, FIG. 7A, FIG. 8A, FIG. 9A, FIG. 10, and FIGS. 11A-11D which are flow charts of compensating the periodic signal in the optical disc drive according to one embodiment of the present invention. The control apparatus performs the control method for compensating the periodic signal accompanied with an input signal in an optical disc drive. The control apparatus 300 includes an amplitude processing unit 306, a phase processing unit 308, a wave generator 314, a first switch module 316a, a second switch module 316b, and a third switch module 316c. The amplitude processing unit 306 comprises a first detecting module 306a and a first adapting module 306b. The phase processing unit 308 further comprises a second detecting module 308a and a second adapting module 308b. The control method includes the following steps:

As shown in FIG. 11A, in step S500, the amplitude processing unit 306 processes the amplitude of the input signal based on a reference signal for generating an amplitude signal wherein the amplitude signal has at least one amplitude value.

Figure 11B:
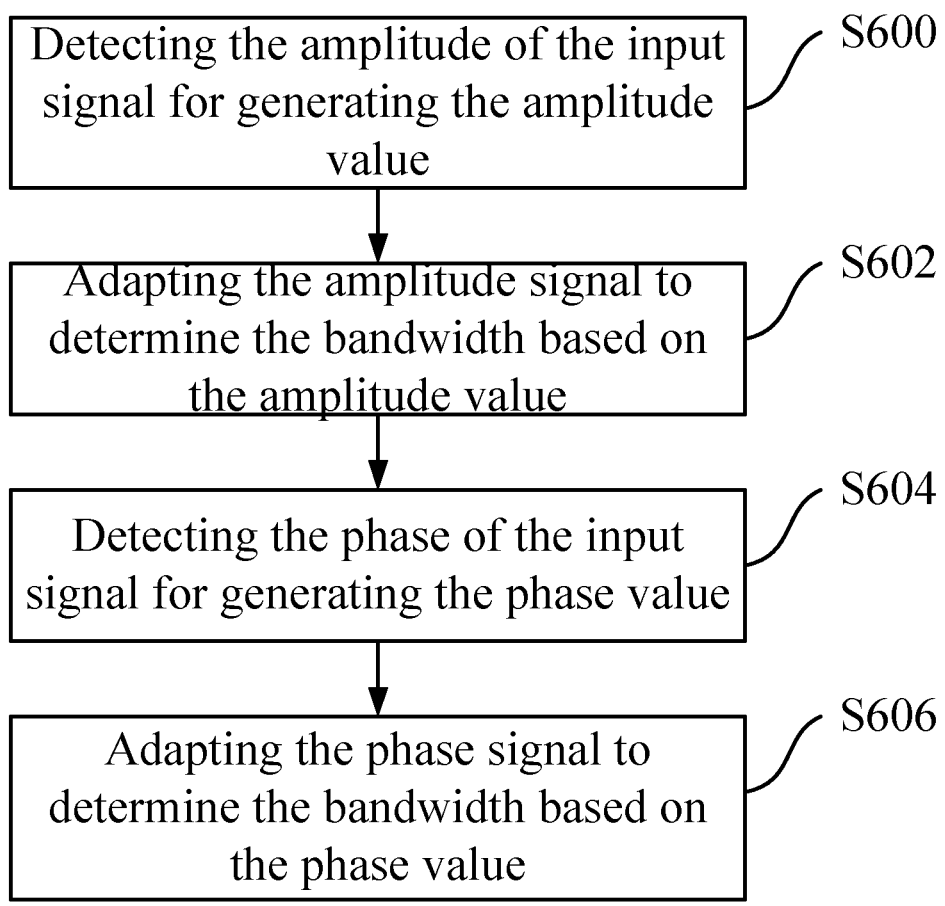

As shown in FIG. 11B, during the step S500, the control method further comprises the steps of:

In step S600, the first detecting module 306a detects the amplitude of the input signal for generating the amplitude value.

In step S602, the first adapting module 306b adapts the amplitude signal to determine the bandwidth based on the amplitude value.

The amplitude value of amplitude signal corresponds to one cycle of the reference signal. After generating the amplitude value during the cycle of the reference signal, the control apparatus sends the amplitude value during next cycle of the reference signal.

As shown in FIG. 11A, in step S502, the phase processing unit 308 processes the phase of the input signal based on the reference signal for generating a phase signal wherein the phase signal has at least one phase value.

As shown in FIG. 11B, during the step S502, the control method further comprises the steps of:

In step S604, the second detecting module 308a detects the phase of the input signal for generating the phase value.

In step S606, the second adapting module adapts the phase signal to determine the bandwidth based on the phase value.

The phase value of the phase signal corresponds to one cycle of the reference signal. After generating the phase value during the cycle of the reference signal, the control apparatus sends the phase value during next cycle of the reference signal. In one embodiment, during the steps S602 and S604, the control apparatus 300 further filters the amplitude signal and filtering the phase signal. For example, the control apparatus 300 adjusts the amplitude signal and the phase signal by a value selected from a gain value, an integrator value and the combinations. The input signal is selected from a group consisting of a tracking error signal, a focusing error signal and a radio frequency signal.

In step S504, the wave generator 314 generates a compensated wave signal based on the amplitude value and the phase value. In one embodiment, the compensated wave signal is a sine wave signal.

In step S506, the wave generator 314 outputs the compensated wave signal.

Figure 11C:
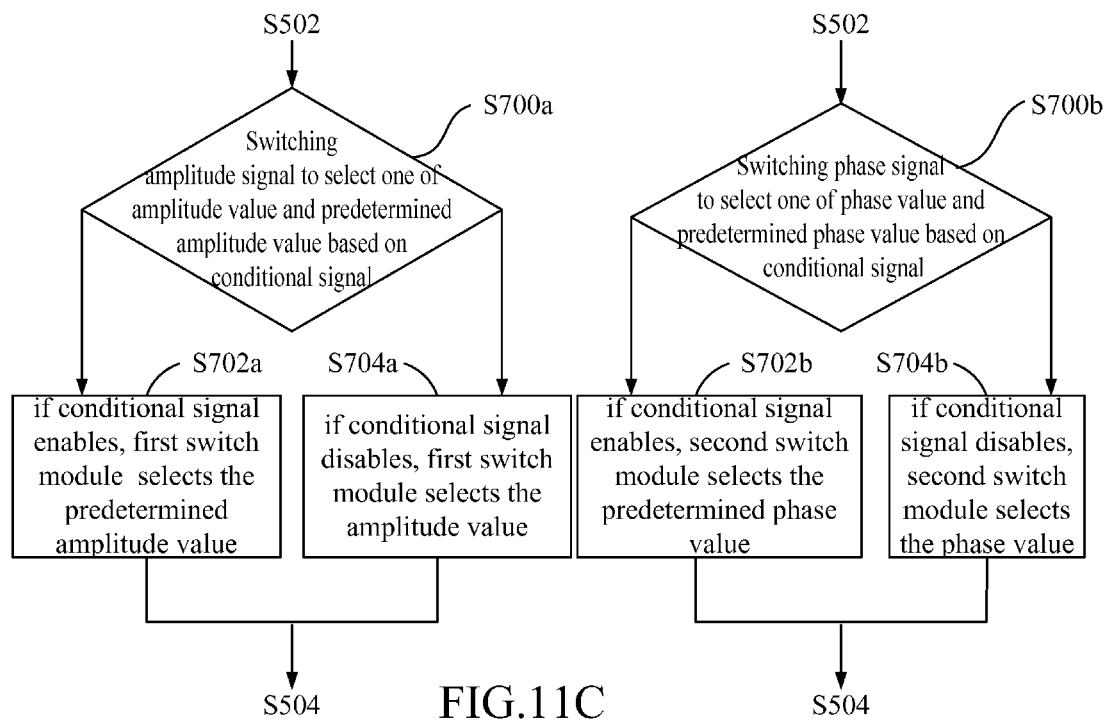

As shown in FIG. 11C, in one embodiment, after the phase processing unit 308 processes the phase of the input signal based on the reference signal for generating a phase signal in the step S502, the control method further comprises the steps:

In step S700a, the first switch module 316a switches the amplitude signal to select one of the amplitude value and a predetermined amplitude value based on a conditional signal. In step S702a, if the conditional signal enables the first switch module 316a, the first switch module 316a selects the predetermined amplitude value. In step S704a, if the conditional signal disables the first switch module 316a, the first switch module 316a selects the amplitude value.

In step S700b, the second switch module 316ba switches the phase signal to select one of the phase value and a predetermined phase value based on the conditional signal. In step S702b, if the conditional signal enables the second switch module 316b, the second switch module 316b selects the predetermined phase value. In step S704b, if the conditional signal disables the second switch module 316b, the second switch module 316b selects the phase value. The control method proceeds to the step S504.

In one embodiment, the control method further generates a fixed wave signal based on the predetermined amplitude value and the predetermined phase value, and performs velocity control based on the fixed wave signal in the optical disc drive.

Figure 11D:
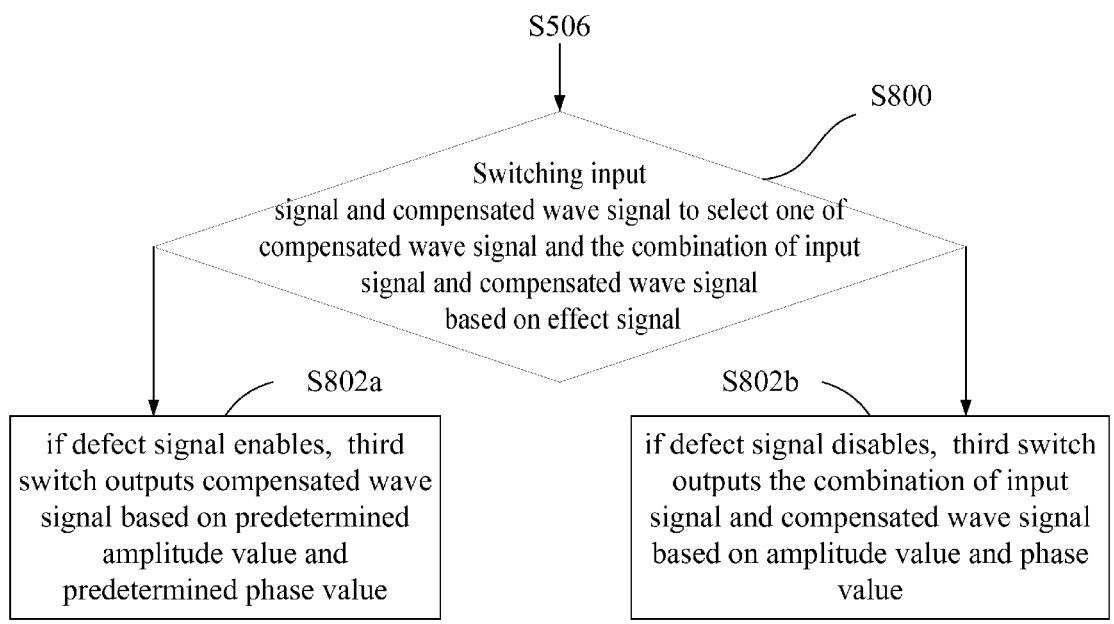

As shown in FIG. 11D, in one embodiment, after the wave generator 314 outputs the compensated wave signal in the step S506, the control method further comprises the steps:

In step S800, the third switch 316c switches the input signal and the compensated wave signal to select one of the compensated wave signal and the combination of the input signal and the compensated wave signal based on an effect signal. In step S802a, if the defect signal enables the third switch 316c, the third switch 316c outputs the compensated wave signal based on the predetermined amplitude value and the predetermined phase value. In step S802b, if the defect signal disables the third switch 316c, the control method outputs the combination of the input signal and the compensated wave signal based on the amplitude value and the phase value.

The advantages of the present invention mainly include: (a) compensating periodic signal to solve the runout problem of an eccentric disk in an optical disc drive; (b) solving the runout problem of a track jump due to an eccentric disk in an optical disc drive; (c) solving the runout problem of a defect area due to an eccentric disk in an optical disc drive; and (d) compensating the periodic signal to solve the wobble effect of a vertical deviation disk in the optical disc drive.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A control apparatus for compensating a periodic signal accompanied with an input signal, the control apparatus comprising:

an amplitude processing unit, processing the amplitude of the input signal based on a reference signal for generating an amplitude signal wherein the amplitude signal has at least one amplitude value;

a phase processing unit, processing the phase of the input signal based on the reference signal for generating a phase signal wherein the phase signal has at least one phase value;

a first switch module coupled to the amplitude processing unit, switching the amplitude signal to select one of the amplitude value and a predetermined amplitude value;

a second switch module coupled to the phase processing unit, switching the phase signal to select one of the phase value and a predetermined phase value; and a wave generator coupled to the first switch module and the second switch module, generating a compensated wave signal based on the selected amplitude value and the selected phase value, and outputting the compensated wave signal.

2. The control apparatus of claim 1, wherein the wave generator is a sine wave generator for generating a sine wave signal.

3. The control apparatus of claim 1, wherein the input signal is selected from a group consisting of a tracking error signal, a focusing error signal and a radio frequency signal.

4. The control apparatus of claim 1, wherein the reference signal is the rotation frequency signal of a spindle motor in an optical disc drive.

5. The control apparatus of claim 1, wherein the amplitude processing unit further comprises:
a first detecting module, receiving the input signal and detecting the amplitude of the input signal for generating the amplitude value;
a first adapting module coupling the first detecting module to the first switch module, adapting the amplitude signal to determine the bandwidth based on the amplitude value.

6. The control apparatus of claim 5, wherein the phase processing unit further comprises:
a second detecting module, receiving the input signal and detecting the phase of the input signal for generating the phase value; and
a second adapting module coupling the second detecting module to the second switch module, adapting the phase signal to determine the bandwidth based on the phase value.

7. The control apparatus of claim 6, wherein the first adapting unit and the second adapting unit are an amplitude filter and a phase filter, respectively.

8. The control apparatus of claim 7, wherein the amplitude filter and the phase filter are selected from a group consisting of a gain adjusting device, a low-pass filter, and the combination of the gain adjusting device and an integrator.

9. The control apparatus of claim 1, wherein the amplitude value of the amplitude signal corresponds to one cycle of the reference signal.

10. The control apparatus of claim 9, wherein the amplitude processing unit generates the amplitude value during the cycle of the reference signal and sends the amplitude value to the first switch module during next cycle of the reference signal.

11. The control apparatus of claim 1, wherein the phase value of the phase signal corresponds to one cycle of the reference signal.

12. The control apparatus of claim 11, wherein the phase processing unit generates the phase value during one current cycle of the reference signal and sends the phase value to the second switch module during next cycle of the reference signal.

13. The control apparatus of claim 1, wherein the first switch module and the second switch module are multiplexers.

14. The control apparatus of claim 1, wherein the wave generator generates a fixed wave signal based on the predetermined amplitude value and the predetermined phase value.

15. The control apparatus of claim 14, wherein an optical disc drive performs velocity control based on the fixed wave signal.

16. The control apparatus of claim 14, further comprising a third switch module coupled to the wave generator and a tracking compensator, switching the input signal and the compensated wave signal to select one of the compensated wave signal and the combination of the input signal and the compensated wave signal.

17. The control apparatus of claim 16, wherein if a defect signal enables the third switch module, the third switch module outputs the compensated wave signal based on the predetermined amplitude value and the predetermined phase value.

18. The control apparatus of claim 16, wherein if a defect signal disables the third switch module, the third switch module outputs the combination of the input signal and the compensated wave signal based on the amplitude value and the phase value.

19. A control method for compensating a periodic signal accompanied with an input signal, the control method comprising the steps of:
processing the amplitude of the input signal based on a reference signal for generating an amplitude signal wherein the amplitude signal has at least one amplitude value;
processing the phase of the input signal based on the reference signal for generating a phase signal wherein the phase signal has at least one phase value;
switching the amplitude signal to select one of the amplitude value and a predetermined amplitude value;
switching the phase signal to select one of the phase value and a predetermined phase value;
generating a compensated wave signal based on the selected amplitude value and the selected phase value; and
outputting the compensated wave signal for compensating the periodic signal in the input signal.

20. The control method of claim 19, during the step of generating the compensated wave signal, further comprising generating a sine wave signal.

21. The control method of claim 19, wherein the input signal is selected from a group consisting of a tracking error signal, a focusing error signal and a radio frequency signal.

22. The control method of claim 19, during the step of processing the amplitude of the input signal, further comprising the steps of:
detecting the amplitude of the input signal for generating the amplitude value; and
adapting the amplitude signal to determine the bandwidth based on the amplitude value.

23. The control method of claim 22, during the step of processing the phase of the input signal, further comprising the steps of:
detecting the phase of the input signal for generating the phase value; and
adapting the phase signal to determine the bandwidth based on the phase value.

24. The control method of claim 23, during the steps of adapting the amplitude signal and adapting the phase signal, further comprising the steps of filtering the amplitude signal and filtering the phase signal.

25. The control method of claim 24, during the steps of filtering the amplitude signal and filtering the phase signal, further comprising the steps of adjusting the amplitude signal and the phase signal by a value selected from a gain value, an integrator value and the combinations.

26. The control method of claim 19, wherein the amplitude value of amplitude signal corresponds to one cycle of the reference signal.

27. The control method of claim 26, after generating the amplitude value during the cycle of the reference signal, further comprising a step of sending the amplitude value during next cycle of the reference signal.

28. The control method of claim 19, wherein the phase value of the phase signal corresponds to one cycle of the reference signal.

29. The control method of claim 28, after generating the phase value during the cycle of the reference signal, further comprising a step of sending the phase value during next cycle of the reference signal.

30. The control method of claim 19, while selecting the predetermined amplitude value and the predetermined phase value, further comprising a step of generating a fixed wave signal based on the predetermined amplitude value and the predetermined phase value.

31. The control method of claim 30, further comprising a step of performing velocity control based on the fixed wave signal in an optical disc drive.

32. The control method of claim 31, further comprising a step of switching the input signal and the compensated wave signal to select one of the compensated wave signal and the combination of the input signal and the compensated wave signal.

33. The control method of claim 32, wherein while a defect signal enables the step of switching the input signal and the compensated wave signal, the control method further comprises a step of outputting the compensated wave signal based on the predetermined amplitude value and the predetermined phase value.

34. The control method of claim 32, wherein while a defect signal disables the step of switching the input signal and the compensated wave signal, the control method further comprises a step of outputting the combination of the input signal and the compensated wave signal based on the amplitude value and the phase value.

* * * * *